United States Patent [19]

Huffman, Jr. et al.

[11] Patent Number: 4,572,429
[45] Date of Patent: Feb. 25, 1986

[54] METHOD AND MEANS FOR CONSERVING ENERGY REQUIREMENTS AND IMPROVING WORKING CONDITIONS OF A SOCK FINISHING FACTORY

[75] Inventors: Albertus W. Huffman, Jr., Granite Falls; Andrew Truhan, Casar, both of N.C.

[73] Assignee: Albertus W. Huffman, Granite Falls, N.C.

[21] Appl. No.: 668,799

[22] Filed: Nov. 6, 1984

[51] Int. Cl.⁴ .............................................. F24D 5/00
[52] U.S. Cl. ................................... 237/2 B; 62/238.6; 237/50; 237/79; 165/901
[58] Field of Search ............................. 237/2 B, 50, 79; 165/DIG. 12, DIG. 2, 901, 45, 59; 62/238.6; 34/86; 312/326; 98/36

[56] References Cited

U.S. PATENT DOCUMENTS 3,050,867 9/1962 Friedman ................................. 34/86
4,322,953 4/1982 Ramlow et al. ............... 62/238.6 X

FOREIGN PATENT DOCUMENTS

WO79/00571 8/1979 PCT Int'l Appl. ................. 237/2 B

Primary Examiner—Henry Bennett
Attorney, Agent, or Firm—Kerkam, Stowell, Kondracki & Clarke

[57] ABSTRACT

The energy requirements of a sock finishing factory consisting at least of a dye house, boarding room and a warehouse are greatly reduced and the working conditions of employees are improved by utilizing waste heat from the boarding room to provide heat for the dye house water requirements and seasonal heat for the warehouse and by supply some of the heat for the dye house water from the air conditioning condenser system.

13 Claims, 8 Drawing Figures

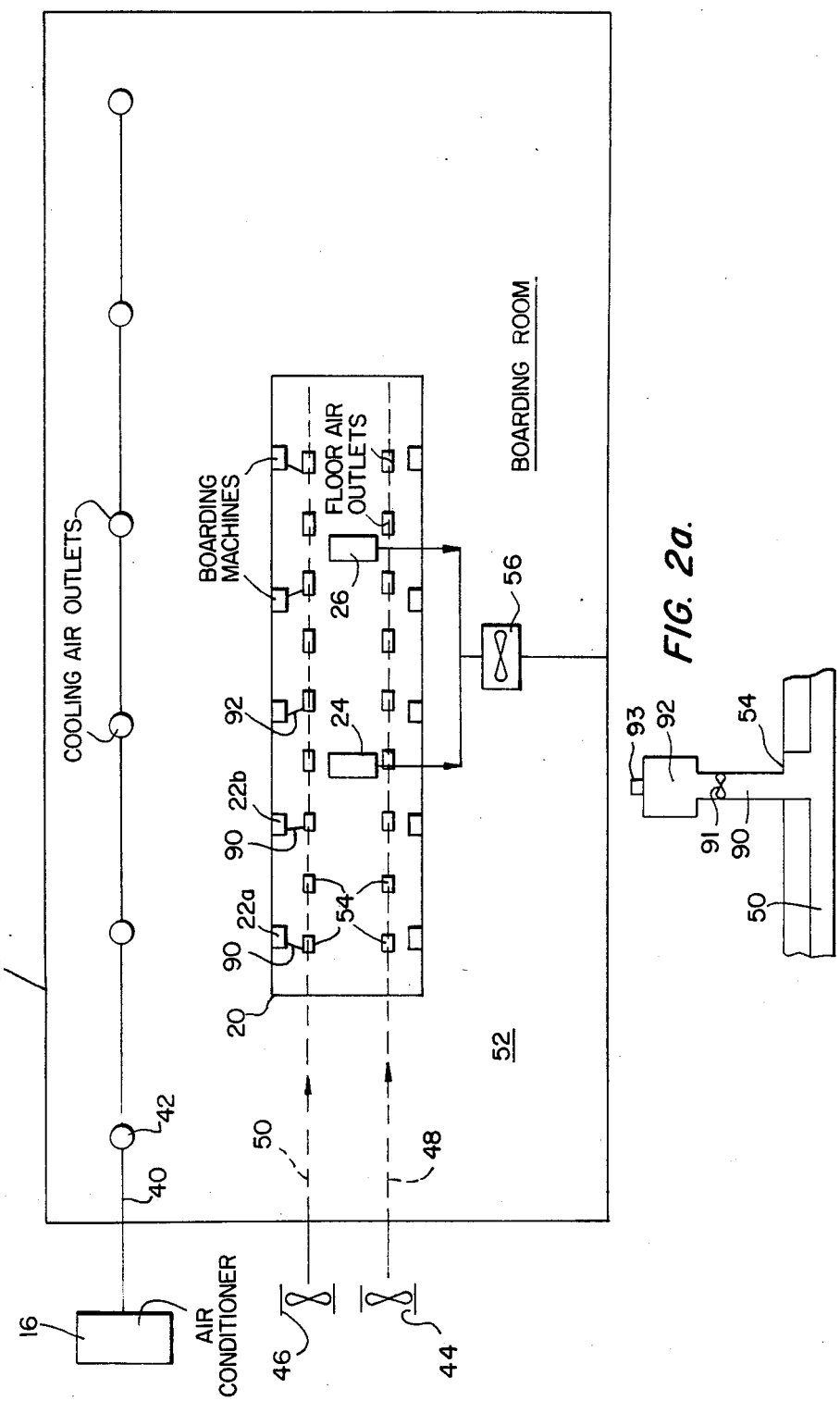

METHOD AND MEANS FOR CONSERVING ENERGY REQUIREMENTS AND IMPROVING WORKING CONDITIONS OF A SOCK FINISHING FACTORY

BACKGROUND OF THE INVENTION

Boarding machines are conventionally used in sock finishing factories where knitted, dyed, and otherwise treated wet socks are placed on sock frames carried by endless chains which carry the frame and sock through a heated zone wherein the socks are finished, dryed and/or set prior to being packaged for shippment to wholesale and/or retail merchants. As is known the socks are dryed (not completely) prior to being put in the boarding process. Thus final drying and setting is carried out on the boarding machines. The socks in the boarding machines are generally electrically heated to a temperature of about 250° to about 285° F. temperature setting of the boarding machines depending on the type of material in the socks and normally each machine produce approximately 80,000 BTU/hour of heat. Each of the boarding machines transfers heat to the socks and the space about the boarding machine through conduction, convection and radiation.

At present finishing factories employ high ventilation around each boarding machine which may be supplemented by spot cooling systems to protect the boarding machine operator. Air conditioning of an entire boarding room is impractical and of questionable value because of the radiant heat transfer directly to an operator.

BRIEF SUMMARY OF THE PRESENT INVENTION

It is a primary object of the present invention to provide a system for drying and setting of socks which greatly reduces the heating requirements of a sock finishing factory and greatly improves the working conditions of employees by utilizing the waste heat from the boarding room and the boarding machines. In conjunction with such system auxiliary heat for the dye house water is provided from the air conditioning system and heat picked up from the boarding machines.

The invention may be generally defined as an energy conserving system for a sock finishing factory and to a system that allows the ambient space around the boarding room enclosure to be air conditioned for workers comfort consisting at least of a dye house, a boarding room housing a plurality of boarding machines and a warehouse comprising, utilizing waste heat from the boarding room to provide heat for the dye house water requirements and the seasonal heat for the warehouse and by supplying some of the heat for the dye house water from an air conditioning system for the boarding room.

BRIEF DESCRIPTION OF THE DRAWINGS

The invention will be more particularly described in reference to the accompanying drawings wherein:

FIG. 2 is a diagramatic view of fresh air and conditioned air flow paths in the bording room containing a plurality of boarding machines;

FIG. 2a is an enlarged fragmentary view of cooling means for the electrical control box in each of the individual boarding machine enclosures;

DETAILED DESCRIPTION OF THE INVENTION

Figure 1:
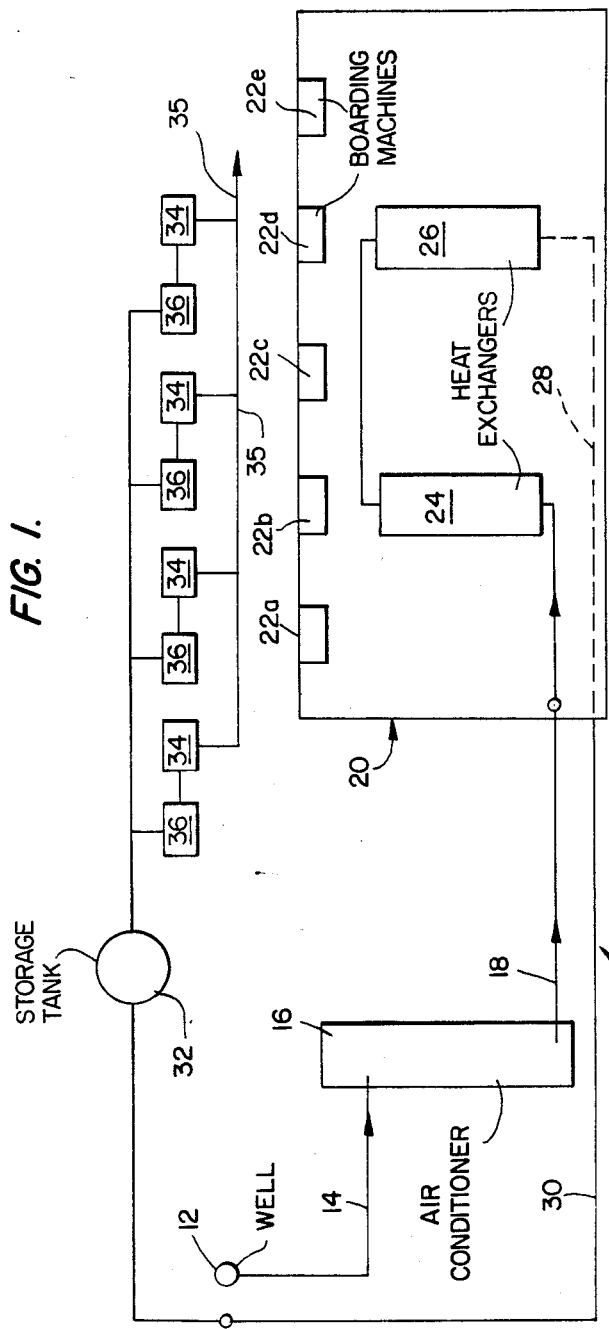
FIG. 1 is a diagramatic view of the water circuitry for the boarding room, the air conditioner, and the dye house.

Referring to the drawings 10 generally designate a portion of a first floor of a sock finishing factory and illustrates the primary flow path for water requirements of the factory. In FIG. 1 12 is a well supplying the water requirements of the factory with the water issuing from the well at for example about 55° F. The water is conveyed by ducts 14, to an air conditioner cooling coil 16 and the water after cooling the coils and the air passing there through issues via duct 18 at approximately 75° F.

The water exiting the air conditioner coils 16 via pipe 18 is directed to an enclosure 20 which encloses a plurality of boarding machines which by way of example comprise machines 22a–22e. In the ceiling of the enclosure 20 are a pair of identical heat exchangers 24 and 26. These heat exchangers, of conventional design, pick up waste heat from the boarding machines 22a, etc. and the heat is absorbed by water flowing in the heat exchanger piping. The water exiting the second air to water heat exchanger 26 flows in pipe 28 containing on its external surface fins so additional heat is absorbed by the water while exiting the enclosure 20.

By way of example the temperature of the water leaving the air to water heat exchanger 26 is now at a temperature of about 118° F. and water leaving the boarding room enclosure 20 is at about 125° F. The heated water flows via pipe 30 to a storage tank 32. The stored and heated water then flows to the dye house, containing a plurality of dyeing machines indicated at 34. In the event insufficient heat is added to the water for the requirements of the dye house supplemental heaters 36 (one for each dyeing machine 34) may be employed. From the dyeing machines the water is sent via duct 35 to a purifying plant thence to disposal.

Referring now more particularly to FIG. 2 there is illustrated the flow path for fresh air and conditioned air from the air conditioner 16. The conditioned air in duct 40 is brought into the boarding room 52 and throughout the room via a plurality of outlet diffusers 42 which diffusers send cooled air around the boarding room enclosure 20 previously illustrated in FIG. 1.

Figure 4:
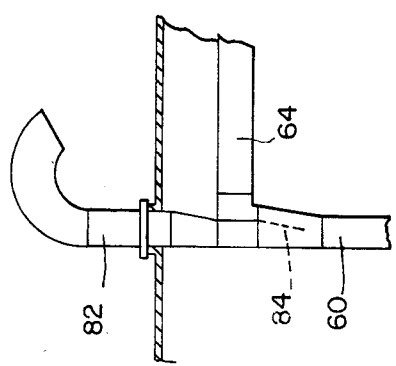
FIG. 4 is a fragmentary sectional view of means for regulating the distribution of a portion of the heated air supply from the boarding room.
Figure 3:
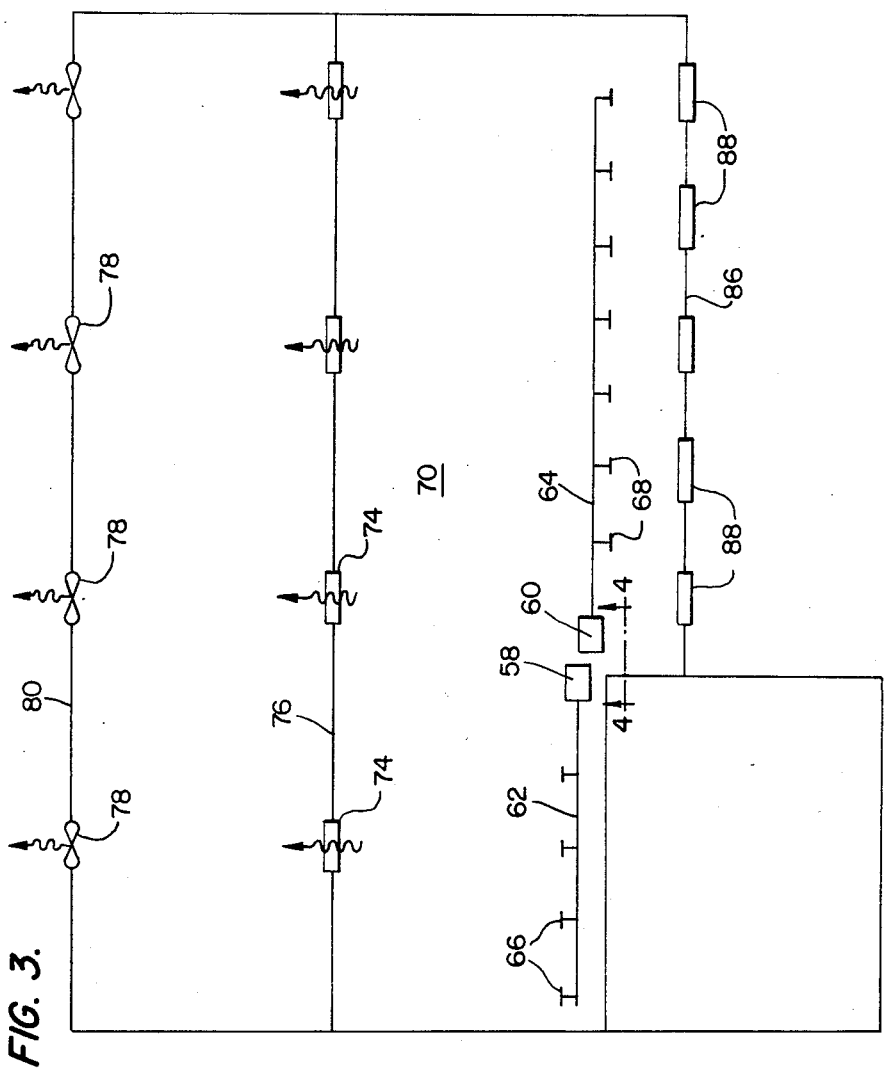
FIG. 3 is a diagramatic flow diagram of the air supply for a warehouse and dye house.

Fresh air is brought into the boarding room enclosure 20 via for example 2 fans 44 and 46 each having a capacity of for example 10,000 cfm. The air flow from the fans passes through ducts 48 and 50 running below the floor of the boarding room 52 and interiorly of the boarding room enclosure there are provided a plurality of upwardly directed air outlets 54. These upwardly directed fresh air ducts cool the spaces around the individual boarding machines 22a, 22b, etc. and the heated air moves upwardly to be employed in the water to air heat exchangers 24 and 26 described in reference to FIG. 1 of the drawing. The air from ducts 48 and 50 picks up heat that is transfered thereto by conduction and convection. Air is withdrawn from the boarding machine enclosure 20 via fan 56 which has a capacity of for example 20,000 cfm. Referring now to FIGS. 3 and 4 the exhaust from fan 56 is directed via a pair of ducts 58 and 60 each carrying approximately 10,000 cubic feet of heated air to lateral ducts 62 and 64 having a plurality of outlet diffusers 66 and 68. These outlet ducts provide heat during the winter for the warehouse 70 and the dye house 72. The heat from the warehouse 70 enters the dye house 72 via diffusers 74 in partition 76 between the warehouse 70 and dye house 72. The air is assisted in its movement across the warehouse and the dye house via a plurality of fans 78 in external wall 80 of the dye house.

Each of the supply ducts 58 and 60 is provided with a roof top discharge 82 FIG. 4 of the drawing. Between the discharge outlet 82 and the lateral 64 is provided a splitter damper 84 which controls the volume of the heated air going to the duct 64 and that portion which is exhausted to atmosphere. In the summer substantially all of the heated air would be exhausted to the atmosphere whereas in the wintertime most of the air would be used to heat the warehouse and dye house.

In the front wall 86 of the warehouse are a plurality of barometric dampers 88. The splitter damper 84 is controlled by modulating thermostats, not shown, in the drawing.

As a safety precaution the fans 78 in wall 80 of the dye house are interconnected with the splitter damper motor to insure that the fans 78 are functioning when heated air is exhausted into the warehouse. If air is directed into the warehouse without the fans 78 in operation air pressure in the warehouse could cause structural damage to the warehouse roof.

In the summer when there are no heat requirements in the warehouse it is desirable to provide ventilation for the warehouse and it is necessary to provide ventilation for the dye house. With the warehouse closed and no heated air entering via the diffusers 66 and 68 the fans 78 in the dye house wall will create a negative pressure and barometric dampers 88 in wall 86 of the warehouse will sense the negative pressure and will open allowing outside air to enter the warehouse thence through the louvers 74 and through the exhaust fan 78 in the dye house wall thence to atmosphere. The same operation will take place on a moderate heating day whenever the thermostat modulates the total exhaust air through the dye house to be below the capacity of the dye house fans. The barometric dampers will modulate and add the make-up air requirements for the exhaust fan system. Thus in addition to controlling pressure in the warehouse the warehouse is heated in the winter and ventilated in the summer.

In the foregoing description the flow rates of air and water and the temperature rise in the air and water are based on a boarding house having 30 boarding machines. Where the number of machines is greater or less it will be apparent to those skilled in the art that temperatures and flow rates would be modified accordingly.

Figure 5:
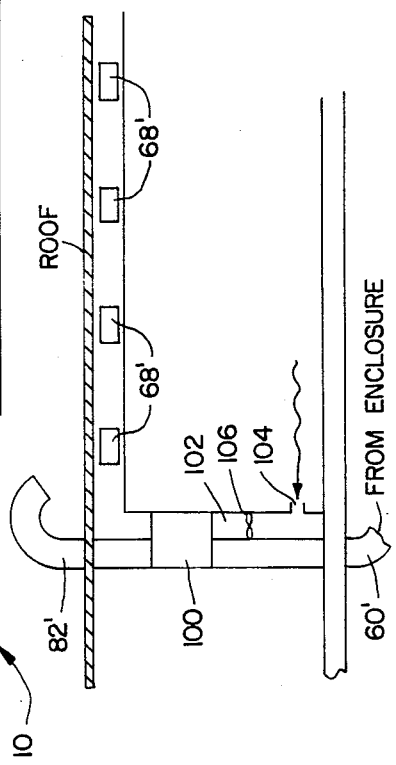
FIG. 5 is an enlarged fragmentary view of an alternate system for heating the warehouse.

Referring to FIG. 5 of the drawing a modified form of the present invention is illustrated wherein it will be seen that duct 60' from the boarding room continues upwardly and discharges the boarding room air via rooftop discharge 82'. The duct 60' is associated with an air to air heat exchanger 100. The air to air heat exchanger 100 is mounted in part in duct 102 having a plurality of difusers 68' directing heated air into the warehouse. In order to provide a flow path for duct 102 the duct is provided with an air inlet 104 and a fan or blower 106 to provide draft for the air flowing through the air to air heat exchanger. The modification is useful in that the air from the boarding room enclosure may have smoke particles, odors, and chemicals therein which would be uncomfortable for the warehouse employees. Using the air to air heat exchanger the heat but not the air from the boarding room is directed into the warehouse.

Figure 7:
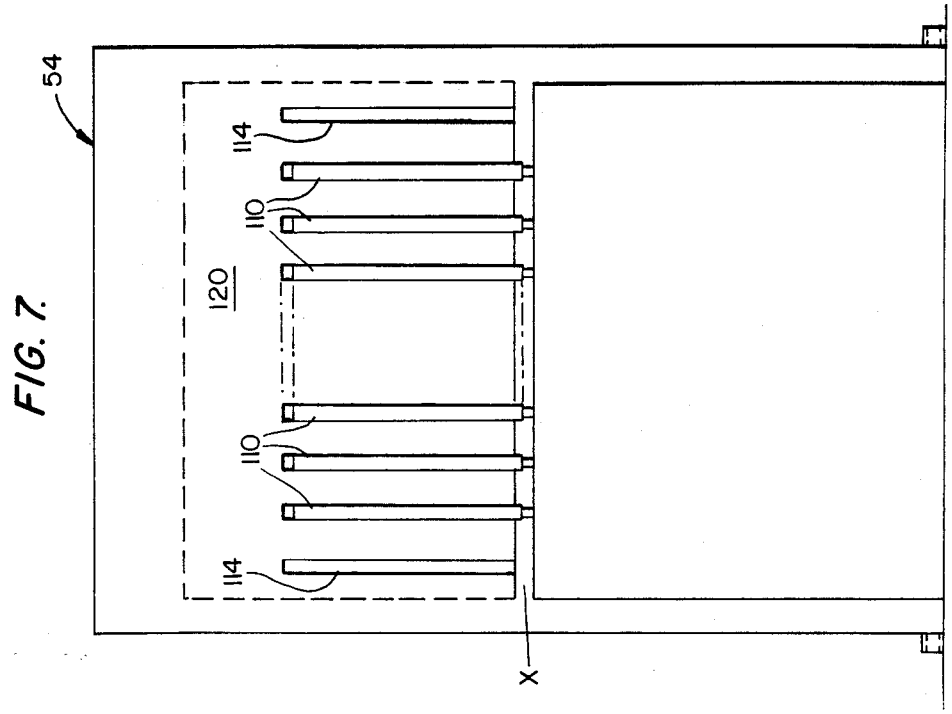
FIG. 7 is a front elevational view of the structures shown in FIG. 6.
Figure 6:
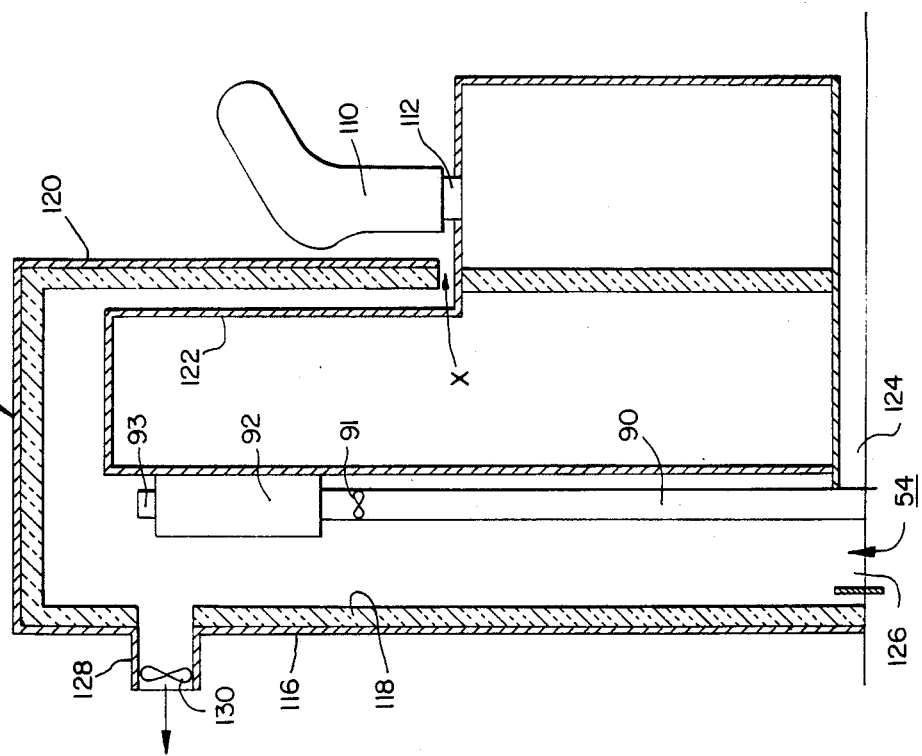
FIG. 6 is a partially sectional view of a single boarding machine having an insulating enclosure.

Referring now to FIGS. 6 and 7 there is illustrated a single boarding machine 54 insulated in accordance with the teachings of the present invention. In FIGS. 6 and 7 the boarding machine includes a plurality of sock receiving boards 110 mounted to an endless chain 112 for movement from a sock receiving station as illustrated in FIG. 6 thence through passageway 114 to the interior of the boarding machine for final drying and/or setting. The entire boarding machine is enclosed in a metal casing 116 provided with insulation 118 about the interior walls to thereby reduce heat losses into the boarding room enclosure and radiant heat directed toward the boarding machine operator. The openings 114 for the boards 110 are provided in the front insulation panel 120 which is spaced outwardly of the front wall 122 of the boarding machine and spaced a distance X above the front of the machine to provide for air passage into the boarding machine enclosure cooling the panel 120 thus further reducing radiant heat directed toward the operator. At the bottom or adjacent the bottom of the machine 124 is the primary air inlet 126 from the outlets 54 FIG. 2 of the drawing. This air is drawn from the enclosure via duct 128 and fan 130. It will also be seen from FIG. 6 the small duct 90 connected to the inlet 126 for the electrical control panel 92. The duct 90 may contain a fan 91 to force the air through the electrical control panel 92 and out the upper outlet 93. In this way overheating and malfunctioning of the electrical control system is readily presented and the comfort of the operator is insured.

It should be pointed out that utilizing well water temperature at 55° F. to provide the cooling for the air conditioner cooling coil results in a higher wet bulb reading for the air leaving the cooling coil. Normally one would expect this to result in a "clammy" feeling to operators in the room even though the air temperature has been lowered. It has been found that this "clammy" feeling is offset in the boarding room as the boards passing in front of the operator at each boarding machine furnish heat to reheat the air thus lowering the wet bulb temperature making the operators zone very comfortable.

It will also be apparent to those skilled in the art that various modifications may be made in the system without departing from the scope of the appended claims. For example, it is preferable that fans 44 and 46 and fan 56 be regulated such that within, the enclosure for the boarding machines, there exists a slight negative pressure whereby any leakage will be into the enclosure rather than from the enclosure in to the room occupied by the boarding machine operators. Further, as previously set forth it has been found to be desirable to provide a small duct from the floor air outlets 54 extending to the electrical control panels of each of the boarding machines 22a, 22b, etc. which small duct is designated 90 and the electrical control panels are designated 92 in FIGS. 2 and 2a of the drawing. With this arrangement the electrical control panels for the electric heaters of the boarding machines are protected from excess heat which may be present in view of the isolation of the boarding machines within the common enclosure 20.

We claim:

1. Energy conserving system for a sock finishing factory consisting at least of a dye house, a boarding room housing a plurality of boarding machines and a warehouse comprising utilizing waste heat from the boarding machines to provide heat for the dye house water requirements and seasonal heat for the warehouse, an air conditioning system for operators of the boarding machines and means supplying some of the heat requirements for the dye house water from the air conditioning condenser system, wherein the plurality of boarding machines are mounted in a common enclosure thereby reducing radiation and convection of heat from the boarding machines to operators in the boarding room, including means for directing outside air into the boarding machine enclosure at the base thereof and means for withdrawing heated air adjacent the top of the enclosure, and wherein the withdrawn heated air is selectively directed to the warehouse or atmosphere depending on seasonal needs.

2. In an energy conserving and personnel protecting system for a sock finishing factory having at least one boarding machine, comprising a boarding machine, said boarding machine having back, sides; top and front walls, heating means for the interior of the boarding machine, heat insulating means for the back, sides, top and front walls of the machines mounted in spaced relation to said walls, passage means for directing ambient air into the lower part of the machine, means for directing air from the upper part of the machine, said last named means including means for drawing ambient air from in front of the machine upwardly along the inner surface of the front wall insulating means further including a duct directing a portion of the ambient air from the passage means to a heat control panel for the boarding machine.

3. The invention defined in claim 1 further including means for directing the heated air from the warehouse through the dye house.

4. The invention defined in claim 3 wherein said last named means comprises openings in a wall between the warehouse and dye house and fans in an opposite wall in the dye-house exhausting air to the atmosphere.

5. The invention defined in claim 4 including a motorized splitter damper in the means for selectively directing heated air from the boarding room to the warehouse, and means interconnecting said damper with control means for the fans in the outside wall of the dye house whereby no heated air is directed into the warehouse without said dye-house fans being in operation.

6. The invention defined in claim 4 further including barometric damper means in an outside wall of the warehouse to provide atmospheric air to the warehouse and dye-house when heated air is not directed into the warehouse.

7. The invention defined in claim 6 wherein the barometric dampers automatically open when the pressure in the warehouse is less than ambient.

8. The invention defined in claim 4 further including means for directing cooled air into the boarding room to cool the space about the operators stations.

9. The invention defined in claim 8 further including a ground well, conduit means directing water from the well to an air conditioner condenser for an air conditioner system for the boarding room operators, means for directing the heated well water from the air conditioner condenser into at least one heat exchanger in the upper portion of the boarding room enclosure, further conduit means directing heated water from the boarding room enclosure to storage means.

10. The invention defined in claim 9 further including heat absorbing fins on the conduit from the at least one heat exchanger in the boarding room to absorb further heat from the boarding machines.

11. The invention defined in claim 10 wherein the stored heated well water is directed to the dying machines in the dye room.

12. The invention defined in claim 2 wherein the control panel is electric.

13. The invention defined in claim 12 further including fan means for said duct.

* * * * *